(12) United States Patent
Chiu

(10) Patent No.: US 11,529,638 B2
(45) Date of Patent: Dec. 20, 2022

(54) SHOWER HEAD WATER COLLECTING DEVICE

(71) Applicant: SAVE WATER DOT CO., LTD., Taoyuan (TW)

(72) Inventor: Hsi-Ying Chiu, Taoyuan (TW)

(73) Assignee: SAVE WATER DOT CO., LTD., Taoyuan (TW)

( * ) Notice: Subject to any disclaimer, the term of this patent is extended or adjusted under 35 U.S.C. 154(b) by 715 days.

(21) Appl. No.: 16/591,493

(22) Filed: Oct. 2, 2019

(65) Prior Publication Data
US 2020/0398288 A1  Dec. 24, 2020

(30) Foreign Application Priority Data

Jun. 21, 2019 (TW) ................................. 108207927

(51) Int. Cl.

| | |
|---|---|
| *B05B 1/18* | (2006.01) |
| *B05B 14/40* | (2018.01) |
| *G01K 13/02* | (2021.01) |
| *A47K 3/28* | (2006.01) |
| *B05B 15/60* | (2018.01) |
| *B05B 14/00* | (2018.01) |
| *E03B 1/04* | (2006.01) |
| *B05B 12/10* | (2006.01) |

(Continued)

(52) U.S. Cl.
CPC .............. *B05B 1/185* (2013.01); *B05B 14/40* (2018.02); *G01K 13/02* (2013.01); *A47K 3/281* (2013.01)

(58) Field of Classification Search
CPC ......... B05B 1/185; B05B 14/40; B05B 15/60; B05B 14/00; B05B 12/10; B05B 1/18; G01K 13/02; G01K 13/026; A47K 3/281; E03B 2001/045; E03B 1/041; Y02A 20/148; Y02P 70/10; E03C 1/0408; E03C 1/06; E03C 1/041
See application file for complete search history.

(56) References Cited

U.S. PATENT DOCUMENTS

| | | | | |
|---|---|---|---|---|
| 2013/0048104 | A1* | 2/2013 | Li | ............................ E03B 1/048 137/386 |
| 2017/0181583 | A1* | 6/2017 | Chiu | ....................... G01K 13/02 |

FOREIGN PATENT DOCUMENTS

| | | | | |
|---|---|---|---|---|
| JP | 3125758 U | * | 10/2006 | |
| TW | 543039 U | * | 6/2017 | ........... B05B 12/004 |

\* cited by examiner

*Primary Examiner* — Herbert K Roberts
*Assistant Examiner* — Anthony W Megna Fuentes
(74) *Attorney, Agent, or Firm* — Maschoff Brennan

(57) ABSTRACT

A shower head water collecting device includes a water collecting hanging component, a temperature sensing element, an assembling component, a solar panel, and a temperature displaying element. The water collecting hanging component is provided for a shower head to be hung thereon and collects the water spraying from the shower head. The temperature sensing element is disposed inside the water collecting hanging component to sense the temperature of water spraying from the shower head. The assembling component is mounted on top of the water collecting hanging component. The solar panel and the temperature displaying element are disposed in the assembling component. The solar panel is electrically connected to the temperature sensing element and the temperature displaying element, wherein the solar panel harvests the light energy from the outside and converts it into electrical energy to supply power to the temperature sensing element and the temperature displaying element.

9 Claims, 8 Drawing Sheets

(51) Int. Cl.
*E03C 1/04* (2006.01)
*E03C 1/06* (2006.01)

SHOWER HEAD WATER COLLECTING DEVICE

FIELD OF THE INVENTION

The present invention relates to a shower head water collecting device, and more particularly relates to a solar-powered shower head water collecting device.

BACKGROUND OF THE INVENTION

A shower head water collecting device is a water collecting device for a shower head. The shower head water collecting device is fastened to a wall of a bathroom for collecting water spraying from the shower head when used in the bathroom.

The conventional shower head water collecting device is with elements including a temperature sensor and a temperature display. The temperature sensor is used to sense the temperature of water spraying from the shower head. The temperature display is used to display water temperature sensed by the temperature sensor such that a user could know the temperature of water spraying from the shower head.

The power of the conventional shower head water collecting device supplying to the temperature sensor and the temperature display is from a battery installed within the shower head water collecting device. And therefore it is required to replace the battery frequently to ensure that the temperature sensor and the temperature display of the shower head water collecting device work properly. However, frequent replacement of the battery is inconvenient. Once the battery power is exhausted, the temperature sensor and the temperature display of the shower head water collecting device cannot keep running. Therefore, the conventional shower head water collecting device is required to be improved.

SUMMARY OF THE INVENTION

Therefore, an objective of the present invention is to provide an improved shower head water collecting device which is with merit that the power source such as a battery for the temperature sensor and the temperature display does not need frequent replacement so as to ensure that the temperature sensor and the temperature display can work properly with less maintenance.

In order to solve the abovementioned problem, the present invention provides an improved shower head water collecting device which comprises: a water collecting hanging component including a water receiving portion, an extending portion and a hanging portion, the water receiving portion having a front surface, the extending portion protruding forward from two sides and a bottom side of the front surface of the water receiving portion so as to form between the water receiving portion and the hanging portion, the hanging portion extending upward from a bottom of the extending portion, the hanging portion having a first blocking element, a second blocking element and a holding portion, the first blocking element and the second blocking element respectively provided on the left side and on the right side of the hanging portion, the holding portion provided between the first blocking element and the second blocking element, an upward extending height of the holding portion being lower than an upward extending height of the first blocking element and an upward extending height of the second blocking element, a spacing distance being respectively provided between the front surface of the water receiving portion and the first blocking element, between the front surface of the water receiving portion and the second blocking element, and between the front surface of the water receiving portion and the holding portion to form an accommodating space among the front surface of the water receiving portion, the first blocking element, the second blocking element, and the holding portion such that the shower head is placed in the accommodating space when a neck portion of the shower head is hung on the holding portion, wherein when the neck portion of the shower head is hung on the holding portion, the front surface of the water receiving portion receives the water spraying from the shower head, and a draining portion provided in a bottom of the extending portion to connect to the accommodating space; a temperature sensing element disposed on the front surface of the water receiving portion to sense a temperature of water spraying from the shower head when the neck portion of the shower head is hung on the holding portion; an assembling component having a connecting portion, an upper protruding portion and a front protruding portion, the connecting portion mounted on top of the water receiving portion, the upper protruding portion extending upward from the connecting portion, the front protruding portion protruding forward from the connecting portion and located above the accommodating space; a solar panel electrically connected to the temperature sensing element and mounted on an upper surface of the front protruding portion; and a temperature displaying element electrically connected to the solar panel and the temperature sensing element, the temperature displaying element disposed on a front side surface of the upper protruding portion.

In one embodiment of the present invention, the improved shower head water collecting device further comprises a pair of slide slots and a fastening member, the pair of slide slots formed on a rear surface of the water collecting hanging component along a longitudinal direction of the water collecting hanging component, a slot entering end formed on a lower side of the water collecting hanging component, a blocking portion formed on the rear surface of the water collecting hanging component in a position corresponding to a position of the slot entering end, the fastening member having a body portion, a supporting portion and a trigger portion, the supporting portion and the trigger portion extending from the body portion, two slide rails protruding from the body portion in two sides of the body portion respectively along the longitudinal direction, a corresponding blocking portion protruding from the supporting portion protruding in such a manner of facing toward the rear surface of the water collecting hanging component, wherein the pair of slide slots of the water collecting hanging component slide into the slide rails of the two sides of the body portion of the fastening member to enable the fastening member to move upward in relation to the body portion until the fastening member moves across the corresponding blocking portion so as to mount the body portion to the pair of slide slots in such a manner that the blocking portion and the corresponding blocking portion are blocked with each other so as to fix the fastening member to the water collecting hanging component, the trigger portion triggered to release the corresponding blocking portion from the blocking portion to allow the body portion of the fastening member to slide away from the pair of slide slots.

In one embodiment of the present invention, the improved shower head water collecting device is provided, wherein the temperature displaying element is a temperature display.

In one embodiment of the present invention, the improved shower head water collecting device is provided, wherein the draining portion is formed in a funnel shape in such a manner that the draining portion tapers from the top to the bottom.

In one embodiment of the present invention, the improved shower head water collecting device further comprises a connecting pipe whose one end is connected to the draining portion, and the other end of the connecting pipe is connected to a water pipe.

In one embodiment of the present invention, the improved shower head water collecting device is provided, wherein the connecting pipe has a fitting portion and a clamping portion, the fitting portion is used to slide within one end of the water pipe such that the fitting portion is disposed inside the end of the water pipe, the clamping portion is used to clamp the end of the water pipe after the fitting portion is slid into one end of the water pipe, an outer tube wall of the clamping portion is provided to screw with an inner tube wall of the draining portion such that the clamping portion is disposed inside the draining portion.

In one embodiment of the present invention, the improved shower head water collecting device further comprises a bent pipe whose one end is connected to the draining portion, and the other end of the bent pipe is connected to a water collecting tank.

By the technical means adopted by the present invention, the improved shower head water collecting device is with economical and environmental benefits for a reason that the solar panel collects the light energy from the outer of the device to convert the light energy into electrical energy so as to supply power to the temperature sensing element and the temperature displaying element in a manner that frequent replacement of battery is not needed. It ensures the temperature sensing element and the temperature displaying element work properly with less maintenance. Furthermore, the solar panel is mounted on the front protruding portion of the device such that the efficiency for collecting light energy from outside is enhanced. The temperature displaying element is disposed on the front side surface of the upper protruding portion such that a user could conveniently read the temperature degree of water spraying from the shower head sensed by the temperature sensing element. Moreover, the fastening member can be securely fastened to the wall of a bathroom, and the water collecting hanging component can be fastened to the fastening member in such a manner that the pair of slide slots slides into the slide rails of the two sides of the body portion of the fastening member. In addition, the water collecting hanging component can be detached from the wall of the bathroom by triggering the trigger portion of the fastening member to enable the pair of slide slots to slide away from the body portion of the fastening member. It thus ensures the safety and the convenience for the installation.

DETAILED DESCRIPTION OF THE PREFERRED EMBODIMENTS

Figure 1A:
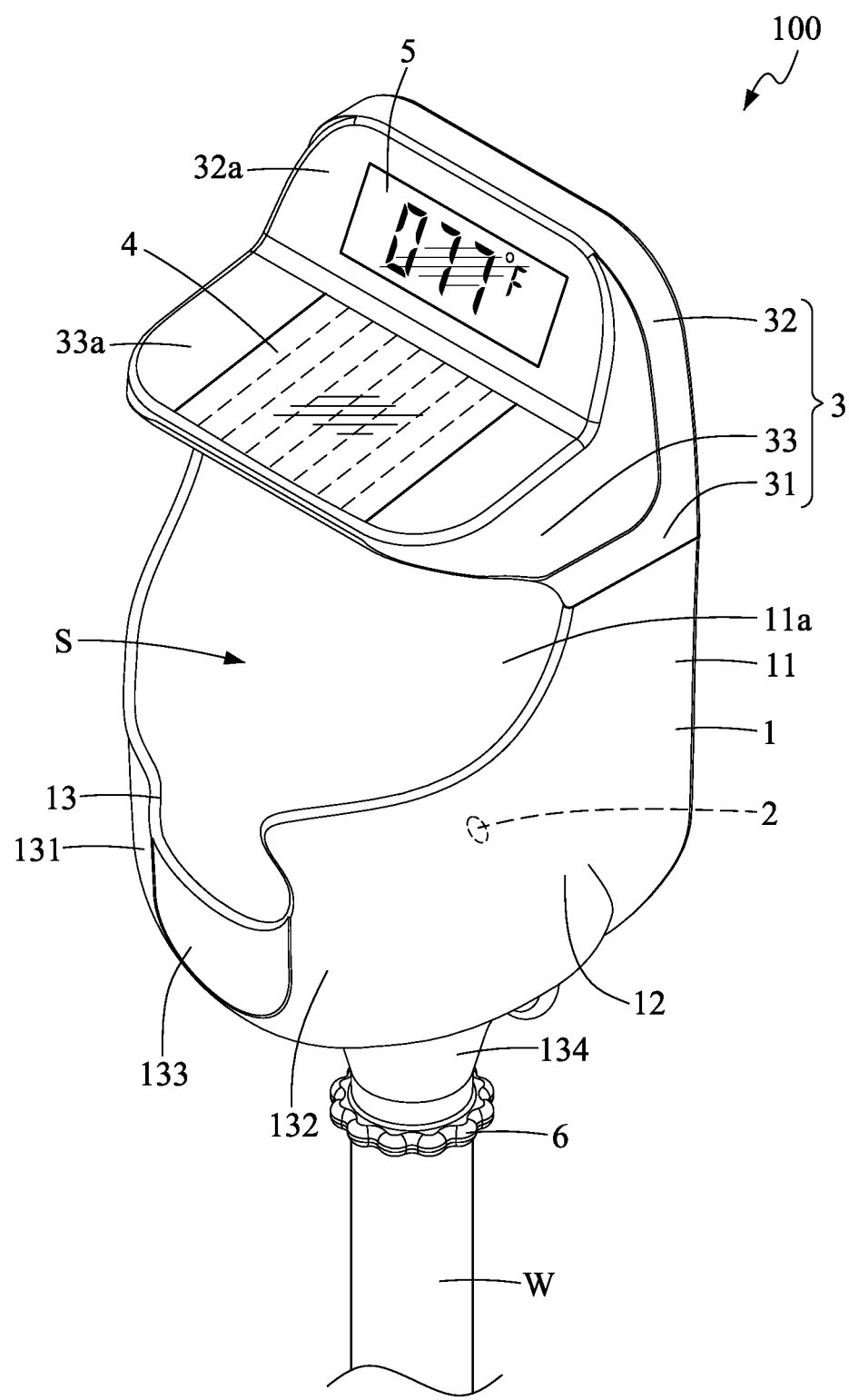
FIG. 1a is a perspective view illustrating an improved shower head water collecting device according to one embodiment of the present invention.

The preferred embodiments of the present invention are described in detail below with reference to FIG. 1a to FIG. 6. The description is used for explaining the embodiments of the present invention only, but not for limiting the scope of the claims.

As shown in FIGS. 1a to 6, according to one embodiment of the present invention, an improved shower head water collecting device 100 comprises: a water collecting hanging component 1, a temperature sensing element 2, an assembling component 3, a solar panel 4, and a temperature displaying element 5.

Figure 1B:
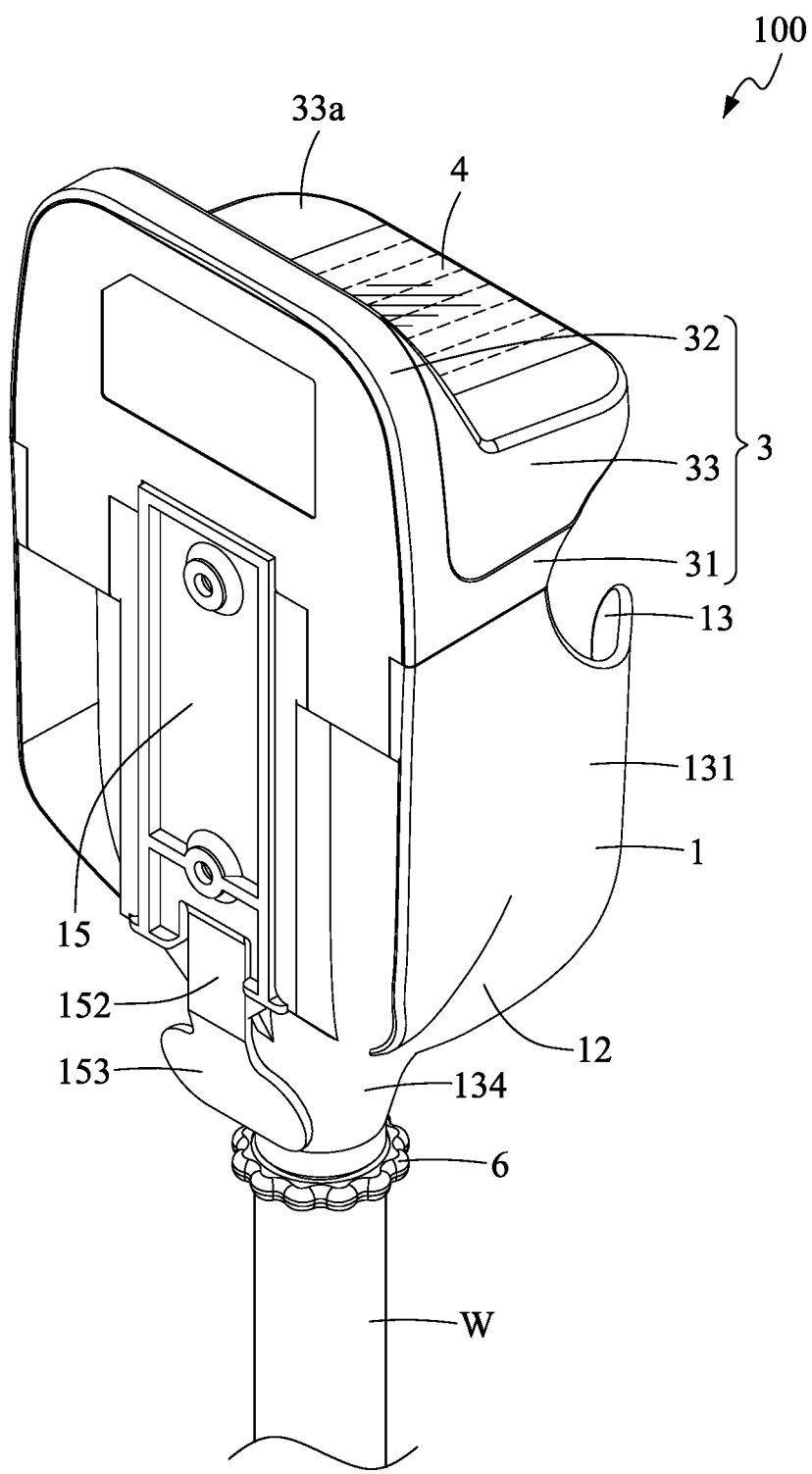
FIG. 1b is another perspective view illustrating the improved shower head water collecting device according to the embodiment of the present invention.

As shown in FIG. 1a and FIG. 1b, in the improved shower head water collecting device 100 according to the embodiment of the present invention, the water collecting hanging component 1 is a rounded cuboid and has a water receiving portion 11, an extending portion 12 and a hanging portion 13. The water receiving portion 11 has a front surface 11a. The extending portion 12 protrudes forward from two sides and a bottom side of the front surface 11a of the water receiving portion 11 so as to form between the water receiving portion 11 and the hanging portion 13. The hanging portion 13 extends upward from a bottom of the extending portion 12, and the hanging portion 13 has a first blocking element 131, a second blocking element 132 and a holding portion 133. The holding portion 133 is provided between the first blocking element 131 and the second blocking element 132.

As shown in FIGS. 1a to 2b, in the improved shower head water collecting device 100 according to the embodiment of the present invention, an upward extending height of the holding portion 133 is lower than an upward extending height of the first blocking element 131 and an upward extending height of the second blocking element 132. A spacing distance is respectively provided between the front surface 11a of the water receiving portion 11 and the first blocking element 131, between the front surface 11a of the water receiving portion 11 and the second blocking element 132, and between the front surface 11a of the water receiving portion 11 and the holding portion 133 to form an accommodating space S among the front surface 11a of the water receiving portion 11, the first blocking element 131, the second blocking element 132, and the holding portion 133 such that the shower head H is placed in the accommodating space S when a neck portion H1 of the shower head H is hung on the holding portion 133. The accommodating space S is used to collect the water spraying from the shower head H.

As shown in FIGS. 1a to 2b, in the improved shower head water collecting device 100 according to the embodiment of the present invention, when the neck portion H1 of the shower head H is hung on the holding portion 133, the front surface 11a receives the water spraying from the shower head H. A draining portion 134 is provided in a bottom of the extending portion 12 to connect to the accommodating space S. Specifically, the draining portion 134 is formed in a funnel shape in such a manner that the draining portion 134 tapers from the top to the bottom. Furthermore, one end of the draining portion 134 could be connected to a water pipe W or a water tank so as to drain the water collecting by the accommodating space S to the water pipe W or the water tank.

As shown in FIGS. 1a to 2b, in the improved shower head water collecting device 100 according to the embodiment of the present invention, the temperature sensing element 2 is disposed on the front surface 11a of the water receiving portion 11 to sense a temperature of water spraying form the shower head H when the neck portion H1 of the shower head H is hung on the holding portion 133.

As shown in FIGS. 1a to 2b, in the improved shower head water collecting device 100 according to the embodiment of the present invention, the assembling component 3 has a connecting portion 31, an upper protruding portion 32 and a front protruding portion 33. The connecting portion 31 is mounted on top of the water receiving portion 11, the upper protruding portion 32 extends upward from the connecting portion 31, and the front protruding portion 33 protrudes forward from the connecting portion 31 and locates above the accommodating space S.

As shown in FIGS. 1a to 2b, in the improved shower head water collecting device 100 according to the embodiment of the present invention, the solar panel 4 is electrically connected to the temperature sensing element 2 and is mounted on an upper surface 33a of the front protruding portion 33 such that the solar panel 4 could efficiently absorb light energy from the above of the assembling component 3 and convert light energy into electrical energy to supply power to the temperature sensing element 2 and the temperature displaying element 5.

Figure 2A:
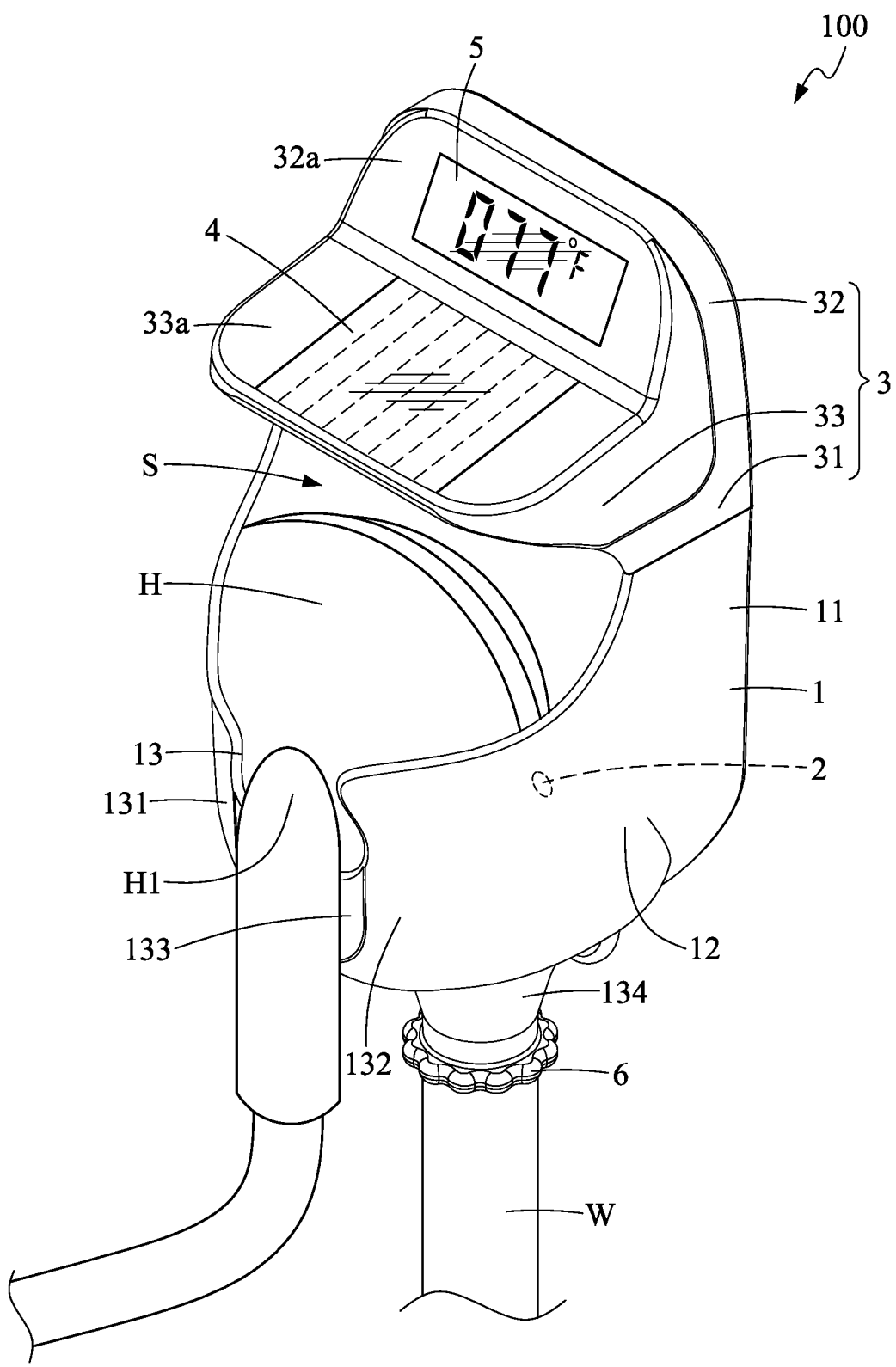
FIG. 2a is a perspective view illustrating the improved shower head water collecting device according to the embodiment of the present invention with a shower head hanging thereon.
Figure 4:
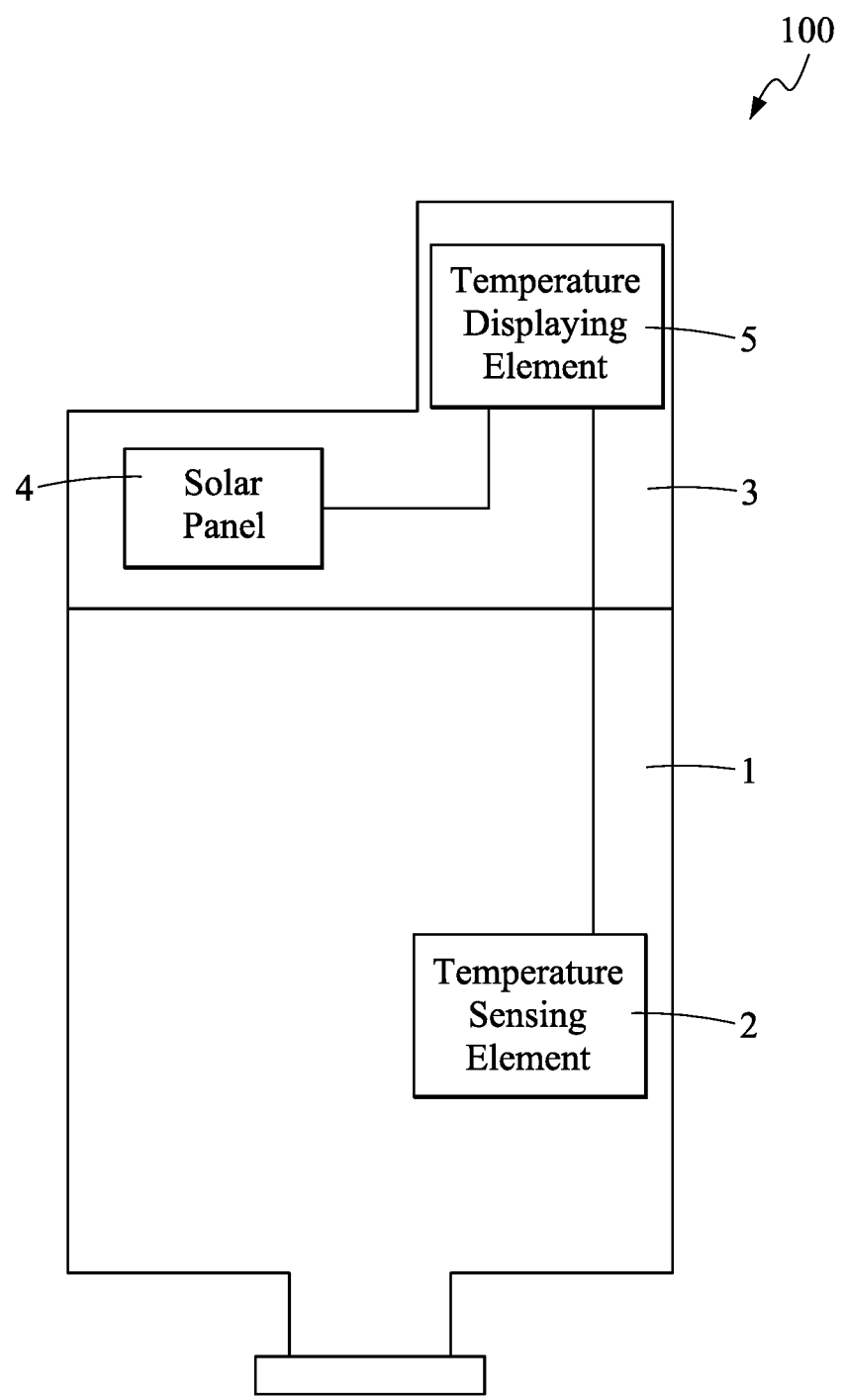
FIG. 4 is a block diagram illustrating a circuit of the improved shower head water collecting device according to another embodiment of the present invention.

As shown in FIGS. 1a, 2a and 4, in the improved shower head water collecting device 100 according to the embodiment of the present invention, the temperature displaying element 5 is electrically connected to the solar panel 4 and the temperature sensing element 2. The temperature displaying element 5 is disposed on a front side surface 32a of the upper protruding portion 32 for a user to conveniently read the temperature displaying by the temperature displaying element 5. The temperature displaying element 5 is a temperature display, such as liquid crystal display.

Figure 3:
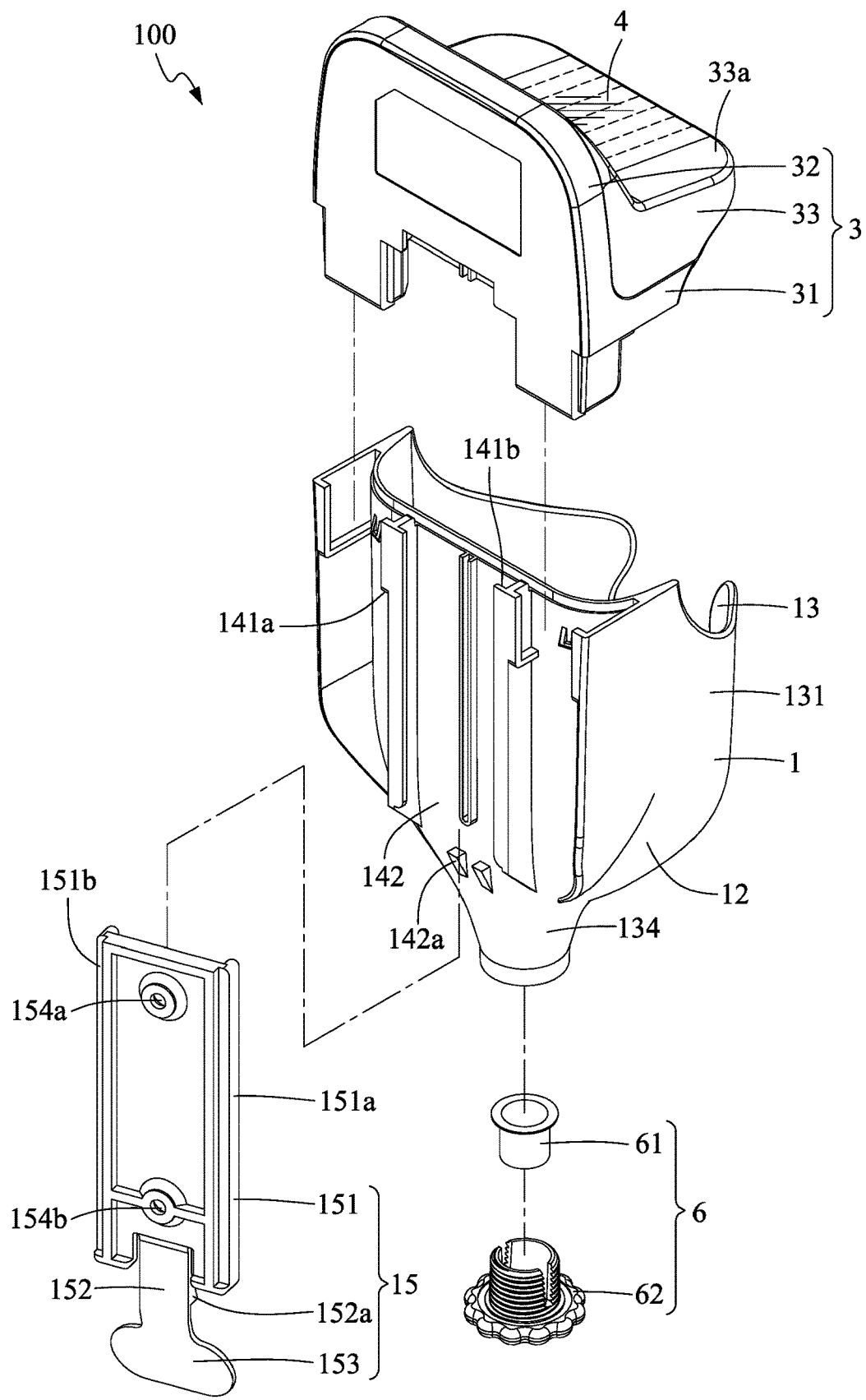
FIG. 3 is an exploded view illustrating the improved shower head water collecting device according to the embodiment of the present invention.

As shown in FIG. 3, in the improved shower head water collecting device 100 according to the embodiment of the present invention, the water collecting hanging component 1 further comprises a pair of slide slots 141a, 141b and a fastening member 15. The pair of slide slots 141a, 141b vertically protrude from a rear surface of the water collecting hanging component 1 along a longitudinal direction of the water collecting hanging component 1, and a slot entering end 142 is formed on a lower side of the water collecting hanging component 1. A blocking portion 142a is formed on the rear surface of the water collecting hanging component 1 in a position corresponding to a position of the slot entering end 142. Specifically, in the present embodiment, a protruding height of the blocking portion 142a protrudes in a steadily changing manner from the bottom of the water collecting hanging component 1 to the top of the water collecting hanging component 1 such that the blocking portion 142a has an inclined plane and the cross-sectional shape of the blocking portion 142a is an inverted right triangle.

As shown in FIG. 3, in the improved shower head water collecting device 100 according to the embodiment of the present invention, the fastening member 15 has a body portion 151, a supporting portion 152, and a trigger portion 153. The supporting portion 152 and the trigger portion 153 extend from the body portion 151, wherein an obtuse angle is formed between the trigger portion 153 and the supporting portion 152. Slide rails 151a, 151b protrude from two sides of the body portion 151 respectively along the vertical direction of the body portion 151. A corresponding blocking portion 152a protrudes from the supporting portion 152 in such a manner of facing toward the rear surface of the water collecting hanging component 1. In the present embodiment, a protruding height of the corresponding blocking portion 152a protrudes in a steadily changing manner from the top of the fastening member 15 to the bottom of the fastening member 15 such that the corresponding blocking portion 152a has an inclined plane, and the cross-sectional shape of the corresponding blocking portion 152a is a right triangle.

Figure 2B:
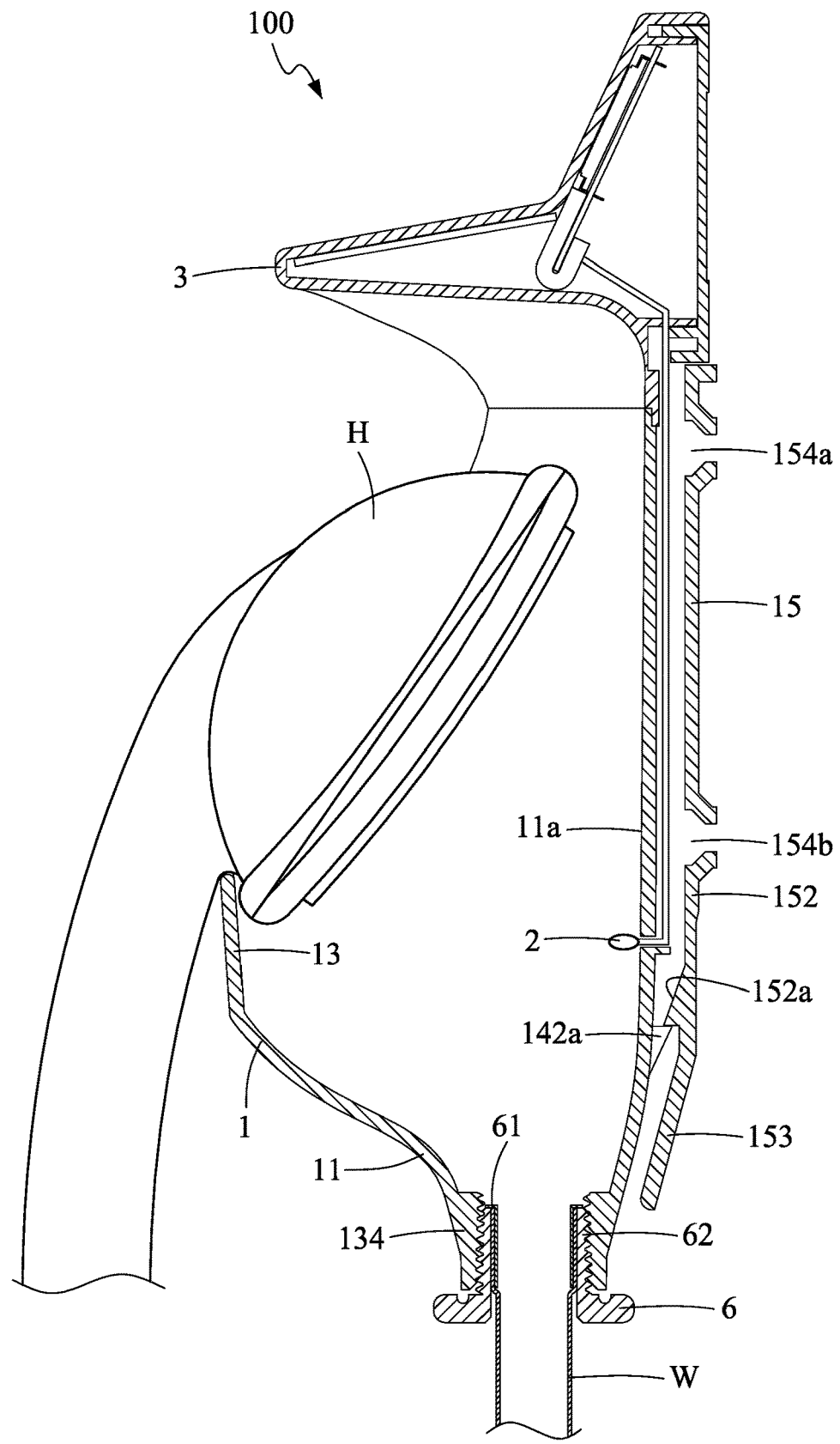
FIG. 2b is a sectional view illustrating the improved shower head water collecting device according to the embodiment of the present invention with the shower head hanging thereon.

As shown in FIG. 2b and FIG. 3, in the improved shower head water collecting device 100 according to the embodiment of the present invention, the fastening member 15 slides in the pair of slide slots 141a, 141b from the slot entering end 142 by the slide rails 151a, 151b at two sides of the body portion 151 such that the fastening member 15 is connected to the back of the water collecting hanging component 1. Furthermore, in the process of connecting the slide rails 151a, 151b to the pair of slide slots 141a, 141b, the blocking portion 142a of the water collecting hanging component 1 moves across the corresponding blocking portion 152a by the guiding and pushing between the inclined plane of the blocking portion 142a and the inclined plane of the corresponding blocking portion 152a of the fastening member 15 so as to entirely mount the body portion 151 to the pair of slide slots 141a, 141b. Further, the fastening member 15 is fixed to the water collecting hanging component 1 in such a manner that a bottom end of the inclined plane of the blocking portion 142a and a bottom end of the inclined plane of the corresponding portion 152a are blocked with each other. In other words, the corresponding blocking portion 152a and the blocking portion 142a has a inclined plane, respectively, and therefore, the corresponding blocking portion 152a moves across the blocking portion 142a in such a manner that the inclined plane of the corresponding blocking portion 152a contacts the inclined plane of the blocking portion 142a. After moving across the blocking portion 142a, the bottom of the corresponding blocking portion 152a is mounted on the top of the blocking portion 142a so as to fix the fastening member 15 to the water collecting hanging component 1. The trigger portion 153 is pressed by a user such that a flat angle is formed between the trigger portion 153 and the supporting portion 152 to release the corresponding blocking portion 152a from the blocking portion 142a to allow the body portion 151 of the fastening member 15 to slide away from the pair of slide slots 141a, 141b.

As shown in FIG. 3, in the improved shower head water collecting device 100 according to the embodiment of the present invention, the fastening member 15 is used to fix to a wall. In detail, the body portion 151 of the fastening member 15 has two mounting holes 154a, 154b, wherein the fastening member 15 could be fixed to a wall in such a manner that two screws are inserted into the two mounting holes 154a, 154b. However, the present invention is not limited to this and the fastening member 15 can be fixed to a wall in other manners.

As shown in FIGS. 1a to 3, in the improved shower head water collecting device 100 according to the embodiment of the present invention, the draining portion 134 is connected to a connecting pipe 6. The connecting pipe 6 is connected to the draining portion 134 and the water pipe W. Specifically, the connecting pipe 6 has a fitting portion 61 and a clamping portion 62. The fitting portion 61 is clamped by an inner wall of the water pipe W and the clamping portion 62 clamps an outer wall of the water pipe W such that the water pipe W is disposed between the fitting portion 61 and the clamping portion 62. A thread is provided on an outer tube wall of the clamping portion 62. A thread (not shown) is provided on an inner tube wall of the draining portion 134. The clamping portion 62 is fixed to the draining portion 134 in such a manner that the thread on the outer tube wall of the clamping portion 62 is screwed with the thread on the inner tube wall of the draining portion 134.

Figure 5:
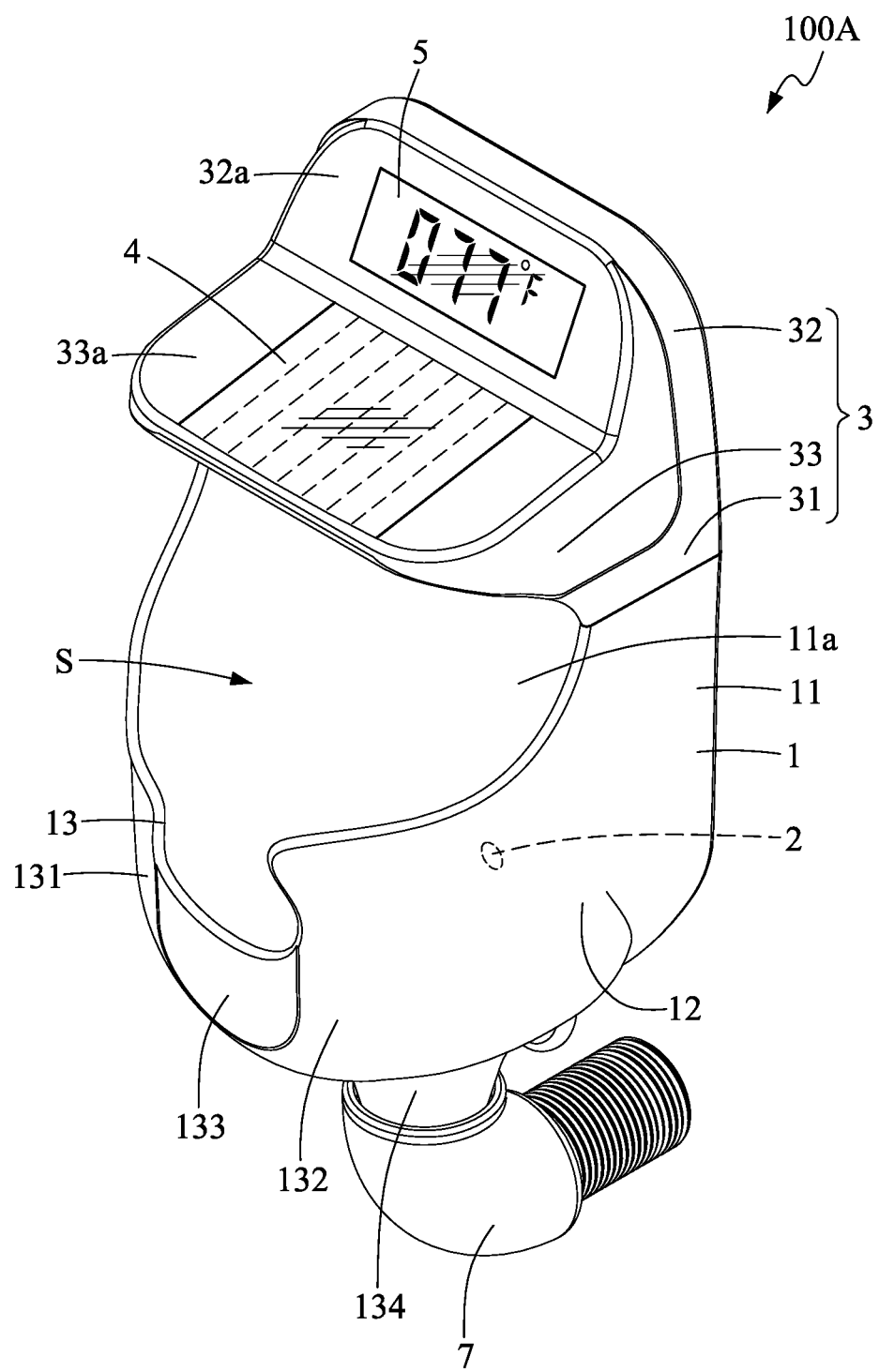
FIG. 5 is a schematic view illustrating the improved shower head water collecting device according to the embodiment of the present invention.
Figure 6:
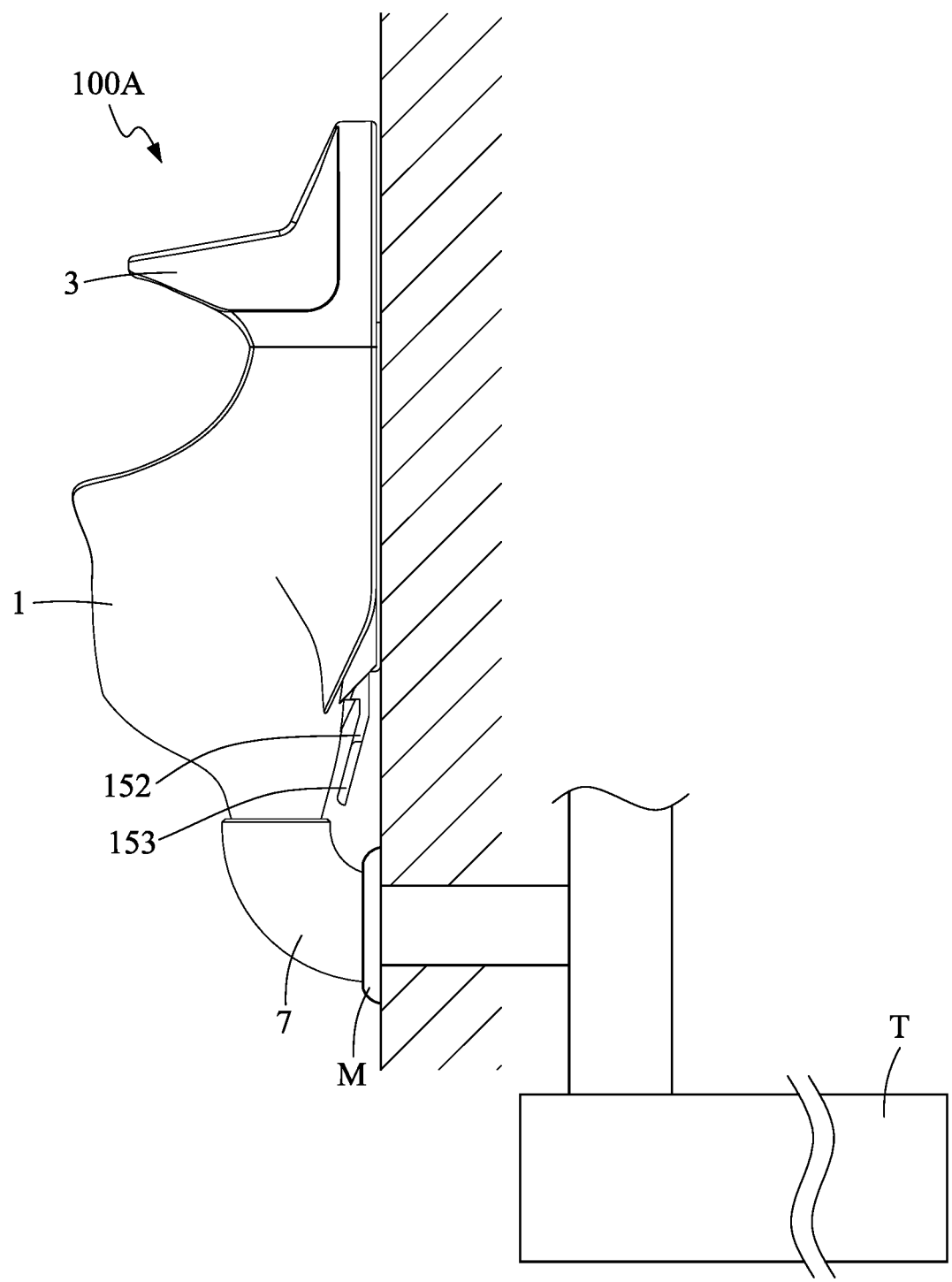
FIG. 6 is a perspective view illustrating the improved shower head water collecting device mounting on a wall according to the embodiment of the present invention.

As shown in FIG. 5 and FIG. 6, according to the second embodiment of the improved shower head water collecting device 100A of the present invention, the improved shower head water collecting device 100A is fixed to a wall, and the draining portion 134 of the improved shower head water collecting device 100A is connected to a bent pipe 7. Specifically, one end of the draining portion 134 is mounted on an inner tube wall of one end of the bent tube 7. The extending-backward end of the bent tube 7 is inserted into a covering member M and is connected to a water collecting tank T so as to deliver the water draining from the draining portion 134 to the water collecting tank T. A thread is provided on the outer tube wall of the extending-backward end of the bent tube 7 and is used to be screwed with a connecting pipe of the water collecting tank T. The covering member M is used to cover an unscrewed thread of the extending-backward end of the bent tube 7 and a portion of the connecting pipe of the water collecting tank T at a construction site on the wall.

With the abovementioned structure, the improved shower head water collecting device 100, 100A is provided that the solar panel 4 can collect the light energy from the outside and convert the light energy into electrical energy to supply power to the temperature sensing element 2 and the temperature displaying element 5 in a manner that frequent replacement of battery is not needed. It ensures that the temperature sensing element 2 and the temperature displaying element 5 work properly with less maintenance. Furthermore, the improved shower head water collecting device 100, 100A can collect the cold water spraying from the shower head for reuse and is with economic and environmental benefits. The solar panel 4 is mounted on the upper surface 33a of the front protruding portion 33 of the assembling component 3 so as to efficiently collect the light energy from the outside. The temperature displaying element 5 is disposed on the front side surface 32a of the upper protruding portion 32 of the assembling component 3 for a user to conveniently read the temperature of water displaying by the temperature displaying element 5. The fastening member 15 can be mounted to the wall of the bathroom in such a manner that two screws are respectively inserted in two mounting holes 154a, 154b. The water collecting hanging component 1 is fixed to the fastening member 15 in such a manner that the pair of slide slots 141a, 141b is slid in the body portion 151 of the fastening member 15, and therefore the user can hang a shower head on the water collecting hanging component 1. Moreover, the water collecting hanging component 1 can be detached from the wall of the bathroom by triggering the trigger portion 153 of the fastening member 15 to allow the body portion 151 of the fastening member 15 to slide away from the pair of slide slots 141a, 141b.

The above description should be considered only as an explanation of the preferred embodiment of the present invention. A person with ordinary skill in the art can make various modifications to the present invention based on the scope of the claims and the above description. However, those modifications shall fall within the scope of the present invention.

What is claimed is:

1. A shower head water collecting device, comprising: a water collecting hanging component including a water receiving portion, an extending portion and a hanging portion, the water receiving portion having a front surface, the extending portion protruding forward from two sides and a bottom side of the front surface of the water receiving portion so as to form between the water receiving portion and the hanging portion, and the hanging portion extending upward from a bottom of the extending portion, the hanging portion having a first blocking element, a second blocking element and a holding portion, the first blocking element and the second blocking element respectively provided on the left side and on the right side of the hanging portion, the holding portion provided between the first blocking element and the second blocking element; an upward extending height of the holding portion being lower than an upward extending height of the first blocking element and an upward extending height of the second blocking element; a spacing distance being respectively provided between the front surface of the water receiving portion and the first blocking element, between the front surface of the water receiving portion and the second blocking element, and between the front surface of the water receiving portion and the holding portion to form an accommodating space among the front surface of the water receiving portion, the first blocking element, the second blocking element, and the holding portion such that the shower head is placed in the accommodating space when a neck portion of the shower head is hung on the holding portion; wherein when the neck portion of the shower head is hung on the holding portion, the front surface of the water receiving portion receives the water spraying from the shower head, and a draining portion provided in a bottom of the extending portion to connect to the accommodating space; a temperature sensing element disposed on the front surface of the water receiving portion to sense a temperature of water spraying from the shower head when the neck portion of the shower head is hung on the holding portion; an assembling component having a connecting portion, an upper protruding portion and a front protruding portion; the connecting portion mounted on top of the water receiving portion, the upper protruding portion extending upward from the connecting portion, and the front protruding portion protruding forward from the connecting portion and located above the accommodating space; a solar panel electrically connected to the temperature sensing element and mounted on an upper surface of the front protruding portion; and a temperature displaying element electrically connected to the solar panel and the temperature sensing element, the temperature displaying element disposed on a front side surface of the upper protruding portion.

2. The shower head water collecting device according to claim 1, further comprising: a pair of slide slots formed on a rear surface of the water collecting hanging component along a longitudinal direction of the water collecting hanging component, a slot entering end formed on a lower side of the water collecting hanging component, and a blocking portion formed on the rear surface of the water collecting hanging component in a position corresponding to a position of the slot entering end; and fastening member having: a body portion, a supporting portion, and a trigger portion; the supporting portion and the trigger portion extending from the body portion, two slide rails protruding from the body portion in two sides of the body portion respectively along the longitudinal direction, a corresponding blocking portion protruding from the supporting portion protruding in such a manner of facing toward the rear surface of the water collecting hanging component; wherein the pair of slide slots of the water collecting hanging component slide into the slide rails of the two sides of the body portion of the fastening member to enable the fastening member to move upward in relation to the body portion until the fastening member moves across the corresponding blocking portion so as to mount the body portion to the pair of slide slots in such a manner that the blocking portion and the corresponding blocking portion are blocked with each other so as to fix the fastening member to the water collecting hanging component; the trigger portion triggered to release the corresponding blocking portion from the blocking portion to allow the body portion of the fastening member to slide away from the pair of slide slots.

3. The shower head water collecting device according to claim 1, wherein the temperature displaying element is a temperature display.

4. The shower head water collecting device according to claim 1, wherein the draining portion is formed in a funnel shape in such a manner that the draining portion tapers from the top to the bottom.

5. The shower head water collecting device according to claim 4, further comprising a bent pipe whose one end is connected to the draining portion, and the other end of the bent pipe is connected to a water collecting tank.

6. The shower head water collecting device according to claim 4, further comprising a connecting pipe whose one end is connected to the draining portion, and the other end of the connecting pipe is connected to a water pipe.

7. The shower head water collecting device according to claim 6, wherein the connecting pipe has a fitting portion and a clamping portion, the fitting portion is used to slide within one end of the water pipe such that the fitting portion is disposed inside the end of the water pipe, the clamping portion is used to clamp the end of the water pipe after the fitting portion is slid into one end of the water pipe, and an outer tube wall of the clamping portion is provided to screw with an inner tube wall of the draining portion such that the clamping portion is disposed inside the draining portion.

8. The shower head water collecting device according to claim 1, further comprising a connecting pipe whose one end is connected to the draining portion, and the other end of the connecting pipe is connected to a water pipe.

9. The shower head water collecting device according to claim 1, further comprising a bent pipe whose one end is connected to the draining portion, and the other end of the bent pipe is connected to a water collecting tank.

\* \* \* \* \*